United States Patent

Nakagawa et al.

Patent Number: 5,232,076
Date of Patent: Aug. 3, 1993

[54] ELECTROMAGNETIC CLUTCH

[75] Inventors: Junichi Nakagawa, Nagoya; Shizuo Watanabe, Chita, both of Japan

[73] Assignee: Nippondenso Co., Ltd., Kariya, Japan

[21] Appl. No.: 885,732

[22] Filed: May 19, 1992

[51] Int. Cl.$^5$ ............................................. F16D 27/14
[52] U.S. Cl. ............................ 192/84 C; 192/107 R; 188/251 M
[58] Field of Search ............ 192/84 C, 84 A, 107 R; 188/251 M; 310/78, 76, 77, 92

[56] References Cited

U.S. PATENT DOCUMENTS

| | | | |
|---|---|---|---|
| 2,180,086 | 11/1939 | Kraft | 192/107 R |
| 2,856,050 | 10/1958 | Mathews | 192/107 R X |
| 3,048,250 | 8/1962 | Kershner | 192/107 R |
| 4,632,236 | 12/1986 | Koitabashi | 192/84 C |
| 4,727,974 | 3/1988 | Takatoshi | 192/84 C |
| 4,951,797 | 8/1990 | Booth et al. | 192/84 C X |
| 5,078,248 | 1/1992 | Yesnik | 192/107 R X |
| 5,123,157 | 6/1992 | Cerny | 192/84 C X |

FOREIGN PATENT DOCUMENTS

| | | |
|---|---|---|
| 62-46029 | 2/1987 | Japan. |
| 62-49025 | 3/1987 | Japan. |

*Primary Examiner*—Leslie A. Braun
*Assistant Examiner*—Andrea Pitts
*Attorney, Agent, or Firm*—Cushman, Darby & Cushman

[57] ABSTRACT

An overhang type electromagnetic clutch used for selectively connecting the rotation of an internal combustion engine to a compressor for an air conditioning system for an automobile. The clutch is provided with a rotor having a sliding surface axially spaced from an outer end of a pulley arranged around the rotor. A bit, which initially is in contact with the sliding surface at a location spaced from the axis of the rotation of the rotor, is radially moved while the rotor is rotated, so that radially spaced apart tool marks eccentric to the axis of the rotation of rotor and having a gradually increased radius are formed on the entire region of the sliding surface. An increased engagement of the sliding surface with an armature is obtained due to the provision of engagements in the circumferential direction. A bit, which initially is in contact with the sliding surface at a location corresponding to the axis of the rotation of the rotor may be first moved radially outward while the rotor is rotated, so that radially spaced apart first tool marks concentric to the axis of the rotation of rotor and having a gradually increased radius are formed on the entire region of the sliding surface. The bit is then moved radially inward so that radially spaced apart second tool marks concentric to the axis of the rotation of rotor and having a gradually decreased radius are formed on the entire region of the sliding surface. As a result, the first and second tool mark cross and provide an engagement in the circumferential direction.

7 Claims, 6 Drawing Sheets

ELECTROMAGNETIC CLUTCH

BACKGROUND OF THE INVENTION

1. Field of the Invention

The present invention relates an electromagnetic clutch used, for example, for an air conditioning apparatus for an automobile, for selectively operating an compressor in the air conditioning apparatus.

2. Description of the Related Art

In an air conditioning apparatus for an automobile, an electromagnetic clutch is used for selectively transmitting the rotation of a crankshaft of the internal combustion engine to a compressor of the air conditioning apparatus. The electromagnetic clutch is provided with a rotor rotatable on a shaft of the compressor, a pulley fixed to the rotor, which pulley is kinematically connected to a crankshaft of the engine, and a armature connected to a hub of the shaft of the compressor. The armature has an engaging surface transverse to the axis of the shaft and facing, with a small gap therebetween, an end surface of the rotor acting as a frictional engaging surface. The pulley and the rotor have an overhanging relationship such that the pulley extends axially beyond the frictional engaging surface of the rotor.

The sliding surface of the rotor is roughened to thereby increase a frictional force obtained when the sliding surface is brought into the contact with the armature. To reduce production costs, this roughening process is carried out after the pulley and the rotor are welded. The overhanging of the pulley with respect to the sliding surface of the rotor makes it difficult to machine that surface with a grinding wheel, and accordingly, a bit is used, to make a tool mark on the sliding surface of the rotor, constructed by a succession of a plurality of sections having a substantially circular shape concentric to the axis of the rotation of the rotor. This concentric construction, however, does not produce a high friction factor, and thus the transmission torque is reduced.

SUMMARY OF THE INVENTION

An object of the present invention is to provide a new construction of an electromagnetic clutch, capable of obtaining a high torque transmission at a reduced production cost thereof.

According to a first aspect of the present invention, an electromagnetic clutch is provided for a selective transmission of a rotational movement from a source to a receiver, comprising:

a rotor having an axis for rotation and connected to said source, the rotor having a first sliding surface extending transverse to said axis;

an armature connected to said receiver and having a second sliding surface extending transverse to said axis;

means for generating a resilient force for causing the first and the second sliding surfaces to be usually axially spaced at a predetermined distance from each other, and;

a solenoid which, when energized, generates an electromagnetic force that allows the first and the second sliding surfaces to be brought into contact with each other against the force of the resilient means;

at least one of the first and the second sliding surfaces including, across substantially the entire area thereof, radially spaced cut mark means eccentric to said axis of rotation.

According to a second aspect of the present invention, an electromagnetic clutch is provided for a selective transmission of a rotational movement from a source to a receiver, comprising:

a rotor having an axis for rotation, and connected to said source, the rotor having a first sliding surface extending transverse to said axis;

an armature connected to said receiver and having a second sliding surface extending transverse to said axis;

means for generating a resilient force for causing the first and the second sliding surfaces to be usually axially spaced at a predetermined distance from each other, and;

a solenoid which, when energized, generates an electromagnetic force that allows the first and the second sliding surfaces to be brought into contact with each other against the force of the resilient means;

at least one of the first and the second sliding surfaces including thereon first cut mark means concentric to said axis of the rotation and having a gradually increased radius from the center to the outer periphery of the sliding surface, and second cut mark means concentric to said axis of the rotation and having a gradually decreased diameter from the outer periphery to the center of the sliding surface, the arrangement of the first and the second cut mark means being such that they cross each other at locations randomly distributed across the entire region of the sliding surface.

DESCRIPTION OF THE PREFERRED EMBODIMENTS

Figure 1:
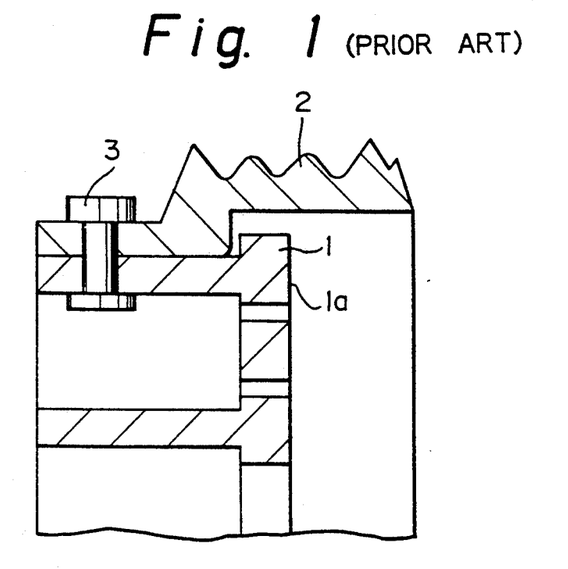
FIG. 1 is a partial view of an electromagnetic clutch of a prior art, wherein a pulley and rotor are connected to each other by riveting.

The problems to be solved by the present invention will be now described. FIG. 1 shows a construction of an electromagnetic clutch in a prior art, and is focused on a portion at which a rotor 1 is connected to a pulley 2 in such a manner that a frictional engagement surface 1a of the rotor 1 is located axially inwardly of the pulley 2. In this case, the torque transmission performance is intended to be increased by roughening the sliding surface 1a. The connection of the pulley 2 to the rotor 2 by welding, however, makes it difficult to obtain a surface 1a having a desired roughness by grinding, because the pulley 2 blocks the access of a large grinding wheel to the surface 1a. Thus, before connecting the rotor 1 and the pulley 2, the engaging surface 1a is first ground by the grinding wheel along the entire surface thereof, the pulley 2 is then press fitted to the rotor 1, and finally, the rotor 1 and the pulley 2 are connected to each other by rivets 3. The riveting is done in a "radial" direction, which is not effective from the point of labor efficiency, and results in an increase in the manufacturing cost. Furthermore, the riveting in the radial direction provides only a low strength of the riveted portions.

Figure 2:
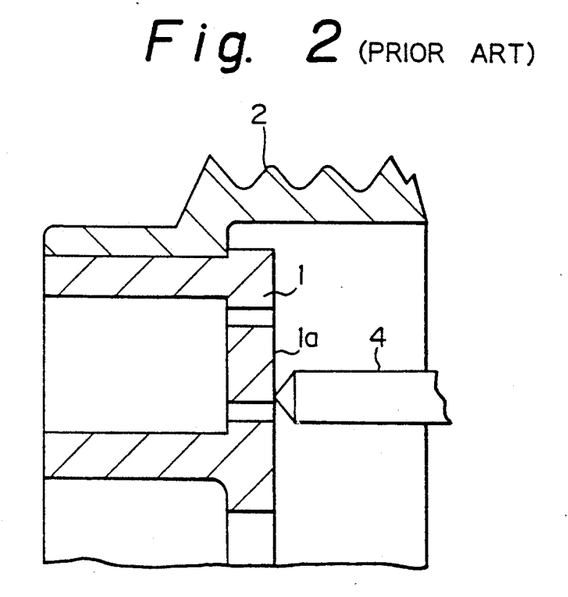
FIG. 2 is similar to FIG. 1 but illustrates another prior art construction.

As another prior art of an electromagnetic clutch as shown in FIG. 2, the torque transmission performance is intended to be increased by providing the engagement surface 1a with cut marks concentric to the axis of the rotation of the rotor, and having a gradually increased radius in a direction from the center to the outer periphery thereof. This construction is intended to allow the rotor 1 to be easily engaged with an opposing member, for obtaining a desired transmission torque. In this case, the pulley 2 is first welded to the rotor 1, and then a pointed cutting tool 4 is axially introduced toward the frictional engaging surface 1a while being moved radially moved thereover, so that traces (tool marks) concentric to the axis of the rotation are formed on the surface 1a. This approach shown in FIG. 2 is advantageous in that the cost of manufacturing the electromagnetic clutch can be reduced. Nevertheless, a test conducted by the inventors of this invention proved that such traces of concentric, varied diameter circles make it difficult for the rotor to be firmly engaged with the armature facing the rotor, in the direction of rotation thereof. Namely, the frictional coefficient of the engaging surface of the rotor is low compared with that obtained by the surface construction providing a randomly arranged unevenness, and thus a drop in the transmission torque of the electromagnetic clutch is inevitable.

Figure 3:
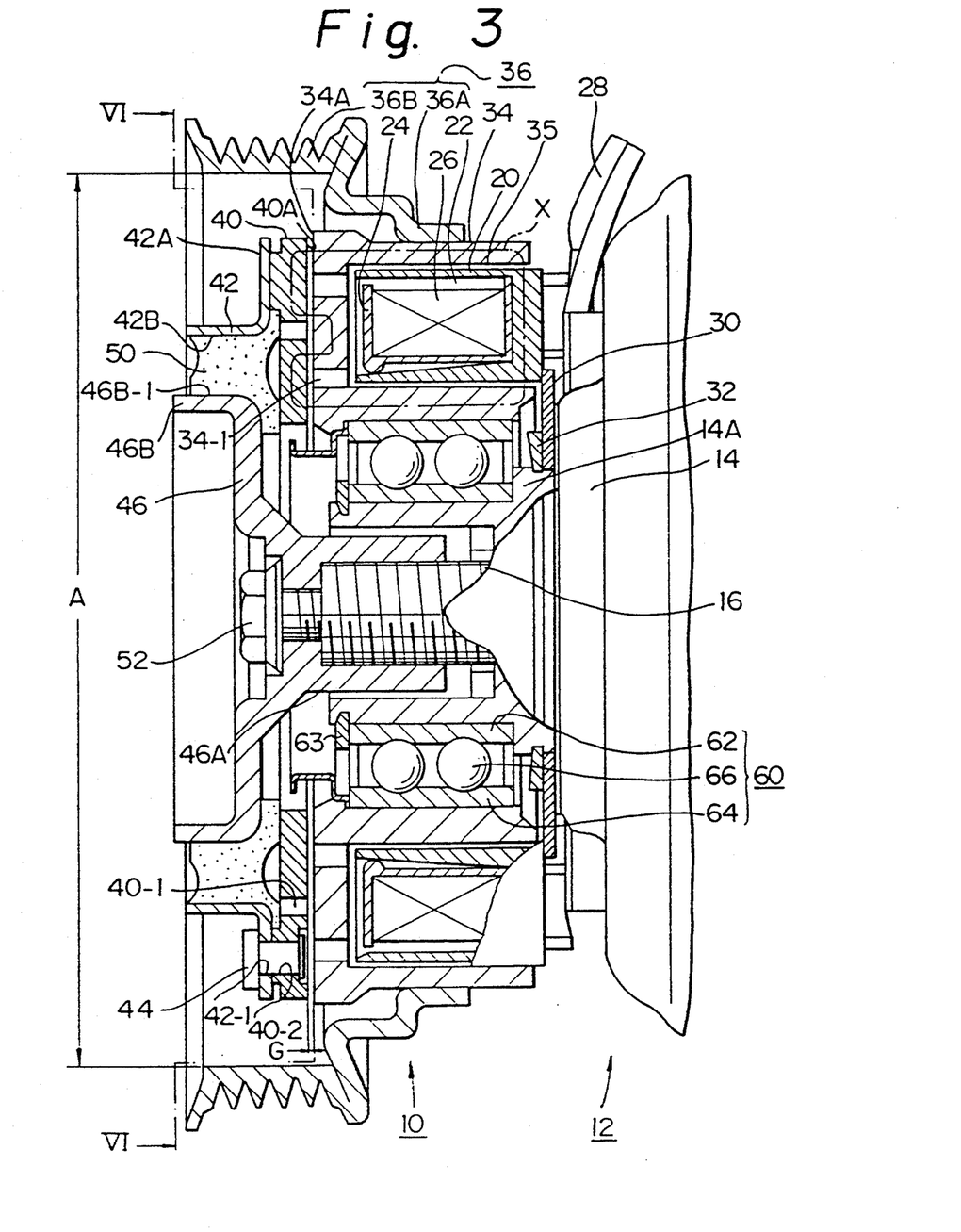
FIG. 3 is a longitudinal cross sectional view of an electromagnetic clutch according to the present invention.

FIG. 3 shows a longitudinal cross section of an electromagnetic clutch to which the present invention is applied. In FIG. 3, reference numeral 10 is an electromagnetic clutch, and 12 is a compressor (only the front portion thereof is shown in the drawing). The compressor 12 is provided with a front housing 14, and a rotating shaft 16 rotatably supported by the housing 14.

The electromagnetic clutch 10 includes an annular stator housing 20, made of magnetizing material, defining an axially outwardly opened chamber 22 in which an annular bobbin 24 having a substantially C cross-sectional shape and made of a plastic material is inserted such that it is radially outwardly opened. A coil 26 is wound about the bobbin 24, which is fixedly connected to the stator housing 20 by a suitable means, such as crimping. The ends of the coil 26 are electrically connected, via respective wires 28, to an electric power supply (not shown).

Figure 6:
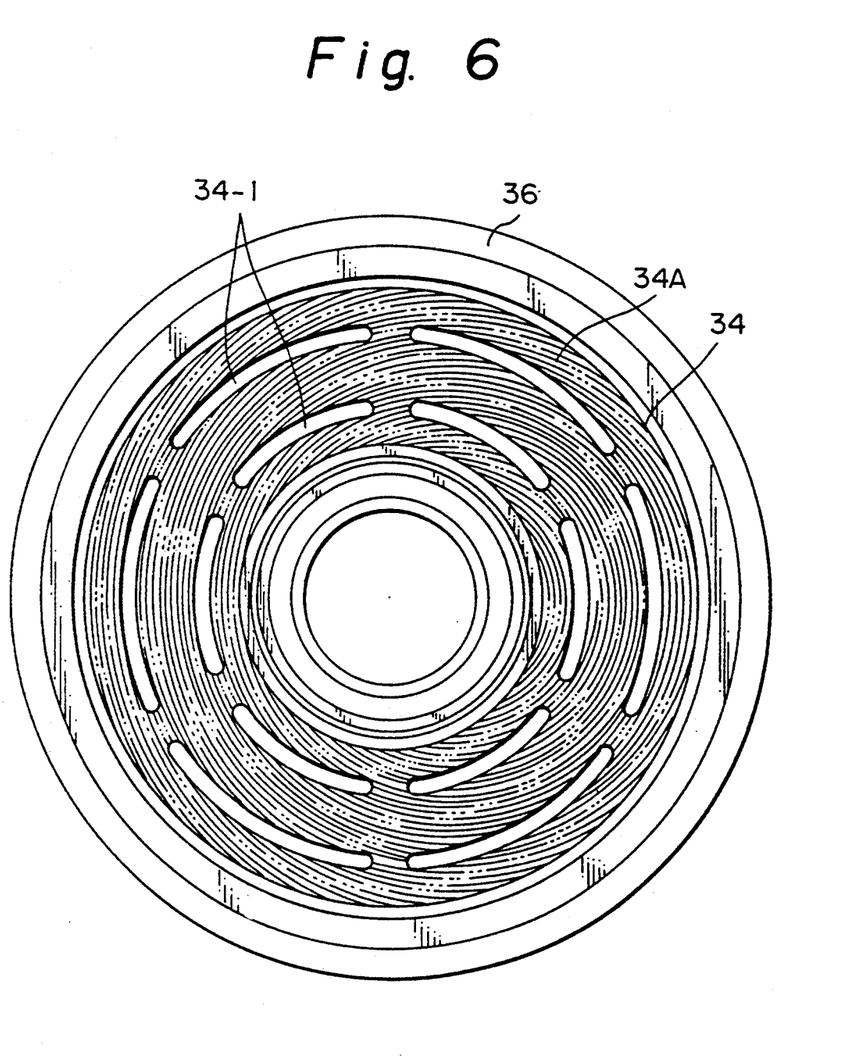
FIG. 6 is a front view of a sliding surface of the rotor in FIG. 3.

The annular stator housing 20 has a substantially C shape cross-section, and has a closed end portion to which an annular flange member 30 is fixedly connected. The flange member 30 has an central bore through which a boss portion 14A of the housing 14 of the compressor 12 is passed. The boss portion 14A has an annular groove with which a circlip 32 is engaged so that the flange member 30 integral with the stator housing 20 is sandwiched between the circlip 32 and the housing 14 of the compressor 12 and fixed thereat. An annular rotor 34 made of a magnetizing material has a substantially C shape cross-section whereby an annular chamber 35 is created, which is opened axially at one end so that the annular stator housing 20 can be coaxially housed in the chamber 36. Small gaps are created between any facing surfaces of the rotor 34 and the stator housing 20, so that a frictionless rotation of the rotor 34 with respect to the stator housing 20 is obtained while maintaining the electromagnetic loss at as small a value as possible. The rotor 34 has an end wall defining an annular sliding surface 34A extending transversely with respect to the axis of the shaft 12. This end wall of the rotor defines radially spaced rows of equiangularly spaced arc shaped slits 34-1 as shown in FIG. 6. A pulley 36 has a radially inner tubular portion 36A which is fixed to an outer wall portion of the rotor 34 by welding, and a radially outer tubular portion 36B defining a plurality of axially parallel annular grooves to which a belt (not shown) from a crankshaft of an internal combustion engine (not shown) is engaged for transmitting a rotational movement from the crankshaft to the compressor 12 via the electromagnetic clutch 10.

An armature 40 having an annular shape has a frictional engagement surface 40A which extends transversely with respect to the axis of the shaft 16, and which faces the sliding surface 34A of the rotor 34 at a small axial spacing G, as shown in FIG. 3. As a result, the energization of the coil 26 causes a closed circuit of a magnetic flux to be created, as shown by a phantom line X in FIG. 3, between the stator housing 20, the rotor 34 and the armature 40, and connects the rotor 34 and the armature 40 each other by a rotational movement. The armature 40 forms a row of equiangularly spaced arc-shaped slits 40-1 (See FIG. 8). An annular armature holder 42 is coaxially arranged with respect to the axis of the shaft 16, and has a radial flange portion 42A to which the armature 40 is connected by rivets 44, which are passed through bores 42-1 and 40-2 and crimped. A hub 46 is arranged also coaxially with respect to the axis of the shaft 16, and has an inner boss portion 46A which is screw engaged to the end of the shaft 16 of the compressor 12, and an outer axial flange portion 46B arranged radially inwardly of the armature holder 42. An annular cushion member 50 made of a rubber material is arranged between the tubular portion 46B of the hub 46 and the holder 42 such that the rubber member 50 is fixedly connected not only to an outer cylindrical surface 46B-1 of the tubular portion 46B but also to an inner cylindrical surface 42B of the holder 42. When the coil 26 is energized, the cushion rubber member 50 allows the armature 40 to be axially moved, together with its holder 42, by the above-explained closed magnetic circuit X so that the armature 40 and the rotor 34 are brought into contact with each other via the respective sliding surfaces 34A and 40A. The cushion rubber member 50 is also intended to reduce an impact occurring when the armature 40 is brought into contact with the rotor by the energization of the coil 26. When the coil 26 is de-energized, to thus reduce the close magnetic circuit X, the elastic force of the cushion rubber member 50 causes the armature 40 to be axially moved so that the sliding surfaces 34A and 40A are separated, to thereby disconnect the compressor 12 from the pulley 36. It should be noted that a bolt 52 is screwed, via the hub 46, to the end of the shaft 16.

A bearing unit 60 for supporting the rotor 34 in the housing 14 of the compressor 12 is constructed by an inner race 62 fitted to the boss portion 14A of the compressor housing 14, and connected thereto by a snap ring 63, an outer race 64 fitted to the rotor 34, and balls 66 located between the inner and outer races 62 and 64.

Figure 4:
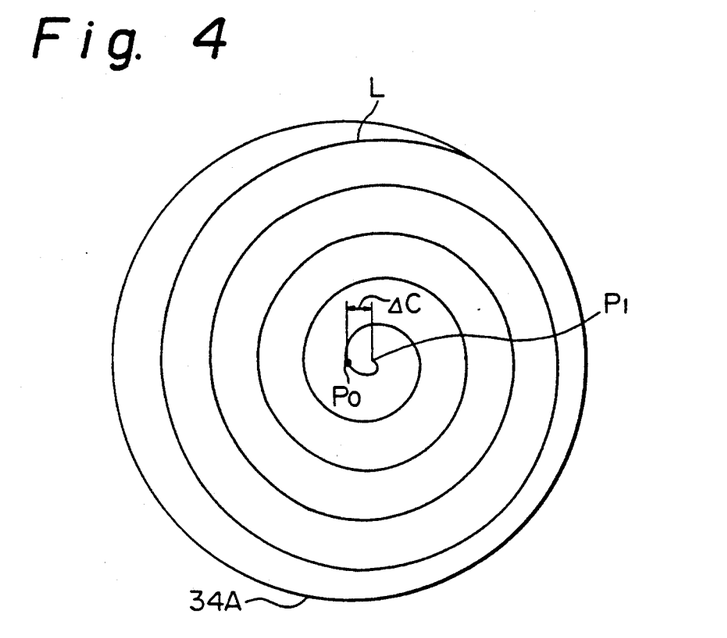
FIG. 4 is a schematic view of an arrangement of the tool marks according to a first embodiment of the present invention.

It should be noted that, according to the embodiment shown in FIG. 3, an inner diameter of the pulley portion 36B is 85 mm, and the rotor 34 is situated inwardly thereof so that the sliding surface 34A is axially inwardly displaced from the pulley portion 34A. Such an overhang arrangement makes it impossible to introduce a grinding wheel having a diameter of, for example, 100 mm, into the sliding surface 34A, as described with reference to FIG. 1. The grinding of the surface 34A is carried out to machine the surface 34A to provide randomly arranged fine unevennesses along the entire region of the surface 34A. According to the present invention, instead of machining the surface 34A by the grinding wheel, the sliding surface is subjected to a cutting process by using a bit, as in the prior art explained with reference to FIG. 2. In the prior art, a plurality of traces (tool marks) as concentric circles having different radii are formed on the sliding surface 34A. In this case, the bit 4 is held in the axis of the machine, while the rotor 34 is chucked so that its center axis $P_0$ is spaced from the machine axis. Such traces as a plurality of concentric circles cannot provide an unevenness promoting an engagement in the direction of rotation, which causes the transmission torque to be lowered when compared with the random unevenness provided by the machining by the grinding wheel as in FIG. 1. In the embodiment of the present invention, the sliding surface 34A of the rotor 34 is subjected to machining by the bit 4, as in FIG. 2, so that radial traces (tool marks) eccentric to the axis of the rotation of the rotor 34 and having a gradually increased radius from the center to the outer periphery of the rotor are obtained across the entire region of the sliding surface 34A. Such a cutting process gives the sliding surface 34A a surface roughness of between 3 to 15 Rz. To obtain such tool marks, after the rotor 34 and pulley 36 are welded, the rotor 34 welded to the pulley 36 is held by a chuck of a lathe (not shown) so that the axis $P_0$ of the rotor 34 is spaced from the axis of the bit 4 by a distance ΔC, as shown in FIG. 4. The machining by the bit 70 is commenced while the bit 4 is moved radially, and as a result, traces (tool marks) located on a curve L are created, which starts from a point $P_1$ spaced by a distance ΔC from the center of the axis $P_0$ of the rotation, and which is continuously and radially spaced further from the point $P_1$ as the line goes further outward. As a result, tool marks eccentric to the axis $P_0$ of the rotation of the rotor and having a gradually increased diameter from the center to the outer periphery of the rotor are created on the sliding surface 34A, across substantially the entire region of the surface 34A. The lowest value of the eccentric amount ΔC is determined by a required torque transmission performance, contrary to the highest value of the eccentric amount ΔC determined from the viewpoint of maintaining a stable cutting operation by the bit, which can maintain the cutting tool without vibration. The eccentric amount ΔC is preferably between 5 to 10 mm, although this is determined by the diameter of the rotor 17.

According to tests by the inventor, the rotor is subjected to a cutting process in accordance with the prior art method wherein a concentric cutting of the trace from the axis of the rotor by a bit was carried out on the sliding surface 34a while the bit was radially moved at a speed of 0.45 mm per one revolution of the rotor. In this case, the sliding surface 34a with the obtained concentric trace provided a standstill fractional coefficient of 0.17. Contrary to this, when the rotor was subjected to a cutting process in accordance with the present invention, wherein an eccentric cutting of the trace from a portion spaced from the axis of the rotor by an eccentric amount ΔC of 5 mm was carried out on the sliding surface 34a while the bit was moved radially at a speed of 0.35 mm per one revolution of the rotor, the obtained sliding surface 34a with the concentric trace provided a standstill frictional coefficient of 0.2, and as a result, a substantial increase in the value of the frictional coefficient can be obtained by the present invention, when compared with the prior art.

Figure 5:
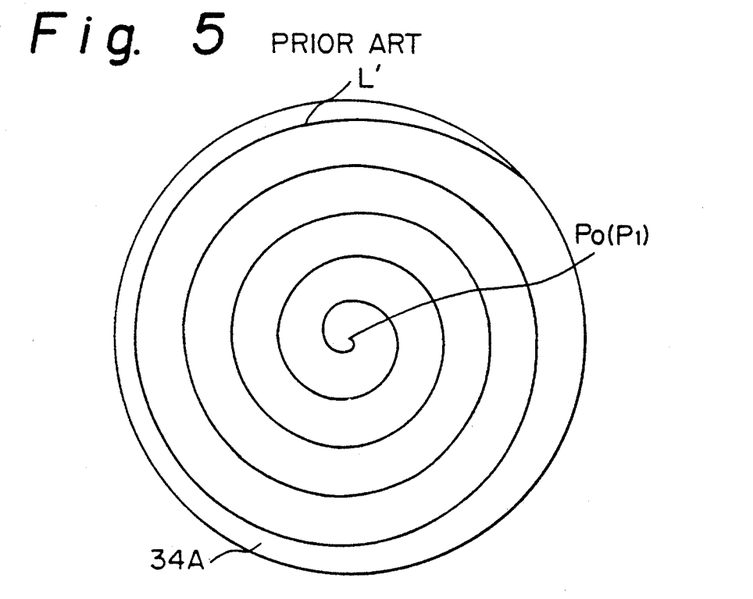
FIG. 5 is similar to FIG. 1 but shows an arrangement of the tool marks in the prior art.

The line L on the sliding surface 34A in FIG. 4 is imaginative, on which eccentric tool marks according to the first embodiment of the present invention are located. The line L starts from the point $P_1$ spaced by a distance ΔC from the axis $P_0$ of the rotation of the rotor. Contrary to this, FIG. 5 shows a similar line L' on the sliding surface 34A in the prior art, on which concentric tool marks are located. This line L' starts from the axis $P_0$ of the rotation of the rotor.

FIG. 6 shows an actual elevational view of the sliding surface 34A of the rotor, taken along the line VI—VI in FIG. 3.

The operation of the electromagnetic clutch according to the above construction will now be explained. When the compressor is to be operated, the solenoid 26 is supplied with a direct current such that a closed flow of the magnetic flux is created along the line X, whereby a force is generated in the armature 40, and thus the armature 40 together with the holder 42 is moved toward the rotor 34, while the cushion rubber member 50 is subjected to an elastic deformation. As a result, the armature 40 and the rotor 34 are brought into contact with each other at the facing sliding surfaces 34A and 40A thereof.

The rotation of the crankshaft (not shown) of the engine is always connected to the pulley via a belt (not shown) connected to a pulley (not shown) on the crankshaft. When the rotor 34 and the armature 40 are brought into contact with each other, the rotation of the pulley 36 is transmitted to the armature 40, then to the holder plate 42 via the rivets 44, and then to the cushion rubber member 50. Namely, a force from the holder plate 42 is applied to the cushion rubber member 50 and twists the cushion rubber 50 with respect to the hub 46, against the force determined by a torque for rotating the shaft 16 and determined by the load of pistons (not shown) of the compressor and the moment of the inertia of the hub 23 when stopped. The deformation of the rubber cushion member 50 generates a force for twisting the rubber cushion member 50 which can overcome the load of the compressor and the moment of inertia of the hub 23 so that the hub 46 is rotated, and thus the shaft 16 of the compressor 12 is rotated.

During the continuous operation of the compressor 12, the cushion rubber member 50 can continuously transmit a drive force to the compressor while being deformed by a predetermined amount corresponding to an average value of the drive torque of the compressor. Upon a change in the drive torque of the compressor, the elastic deformation of the cushion rubber member 50 is correspondingly changed, so that the transmission of the rotational movement from the pulley 36 to the compressor via the sliding surfaces 34A and 40A as engaged is obtained while the variation in the rotational speed is dampened. The eccentric tool marks on the line L on the sliding surface 34A of the rotor 34 allow the torque to be positively transmitted from the rotor 17 to the armature 20.

When a disconnecting of the transmission of the rotation by the electromagnetic clutch is required, the solenoid 26 is de-energized, causing the electromagnetic force to be reduced and thus the elastic return force of the cushion rubber 50 causes the armature 40 to be separated from the rotor 34 and a gap G having a predetermined value to be created between the sliding surfaces 34A and 40A of the rotor 34 and the armature 40.

As described above, according to the first embodiment of the overhang type, when the pulley 36 and the rotor 34 are connected to each other, cut marks on the line L eccentric to the center $P_0$ of the rotation of the rotor 34 having a gradually increased radius in the direction from the center to the outer periphery of the rotor are formed on the sliding surface 34A of the rotor 34, across substantially the entire area of the sliding surface 34A. The sliding surface 34A of the rotor 34, when the solenoid 26 is energized, is brought into close contact with the armature, and effectively transmits the rotation of the rotor 34 to the armature because the eccentric tool marks on the L provide an effective engagement between the rotor and the armature in the rotational direction thereof. As a result, an increased rotating torque transmission can be obtained, compared to the prior art wherein concentric tool marks are formed on the sliding surface of the rotor along the line L' in FIG. 5 and provided only a limited torque transmission, since it does not provide a sufficient engagement in the rotational direction.

Figure 7:
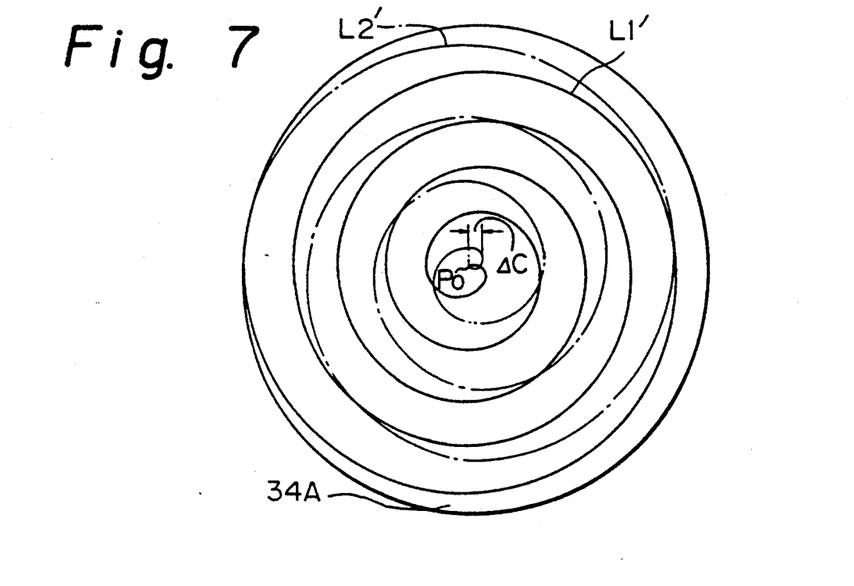
FIGS. 7 and 8 are schematic views of an arrangement of tool marks in the second and third embodiments of the present invention, respectively; and, FIG. 9 is a front view of a sliding surface of an armature in a fourth embodiment of the present invention.

FIG. 7 shows a second embodiment. In this embodiment, the bit 4 (FIG. 2) is moved radially outward from the center $P_0$ of the rotor 34 to the outer periphery of the rotor at a first speed, and is then moved radially inwardly from the outer periphery of the rotor to the center $P_0$ of the rotor 34 at a second speed different to the first speed. As a result, first tool marks are formed on the sliding surfaces 34A along the first line $L_1$ and having a continuously increased diameter in the direction from the center $P_0$ of the rotor 34, and second tool marks are formed on the sliding surface 34A along a second line $L_2$ and having a continuously increased diameter in a direction from the center $P_0$ of the rotor 34, so that the first and second cross marks cross at locations randomly distributed along substantially the entire region of the sliding surface. By differentiating the speed of the movement of the bit between the radially outward movement and the radially inward movement, the first and the second tool marks along the lines $L_1$ and $L_2$, respectively, even if concentric with respect to the center $P_0$ of the rotor 34, it is possible for the marks $L_1$ and $L_2$ to positively cross each other at locations randomly distributed along substantially the entire region of the sliding surface, which allows the sliding surface 34A to be engaged with the opposing surface of the armature in the circumferential direction.

In the above construction of FIG. 7, a test was conducted in such a manner that the speed of the radial outward movement of the bit from the center was 0.35 mm per one revolution, and the speed of the radial inward movement of the bit to the center was 0.50 mm per one revolution. As a result, the tool marks along the lines $L_1$ and $L_2$, which intersect each other, were obtained and provided a standstill frictional coefficient of the sliding surface of a value of 0.18. A comparative test was conducted in accordance with the prior art construction wherein only a single concentric trace of spiral shape was obtained by radially moving the bit from the center of the rotation of the rotor under a speed of 0.45 mm per one revolution, and this provided a standstill friction coefficient of a value of 0.17, which is smaller than that obtained from the present invention in FIG. 7.

As described above, in the second embodiment, the bit is first moved radially outward from the center of the rotor, and then moved radially inward from the outer periphery, so that concentric tool marks along the lines $L_1$ and $L_2$ having a continuously increased radius in the direction from the center to the outer periphery are formed such that they cross each other. This arrangement makes it possible for the tool marks to be crossed at locations randomly distributed across the entire region of the sliding surface 34A. As a result, the engagement in the circumferential direction can be effectively carried out and the torque transmission efficiency improved, even if cutting of the sliding surface is employed in place of grinding.

Figure 8:
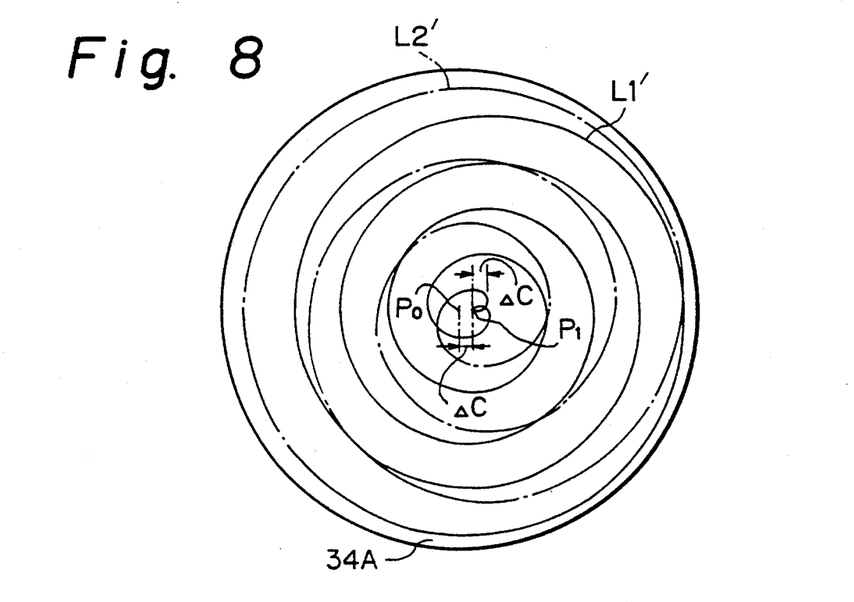

As shown in FIG. 8, tool marks on the lines $L_1'$ and $L_2'$, instead of being concentric to the axis $P_0$ of the rotation of the rotor, are eccentric thereto ($P_0$ in spaced from $P_1$ for $\Delta C$), similar to the tool mark on the line L in the first embodiment, but the speed of the movement of the bit is changed for the radially outward movement and for the radially inward movement, so that the eccentric tool marks on the line $L_1'$ and $L_2'$ can intersect each other.

Figure 9:
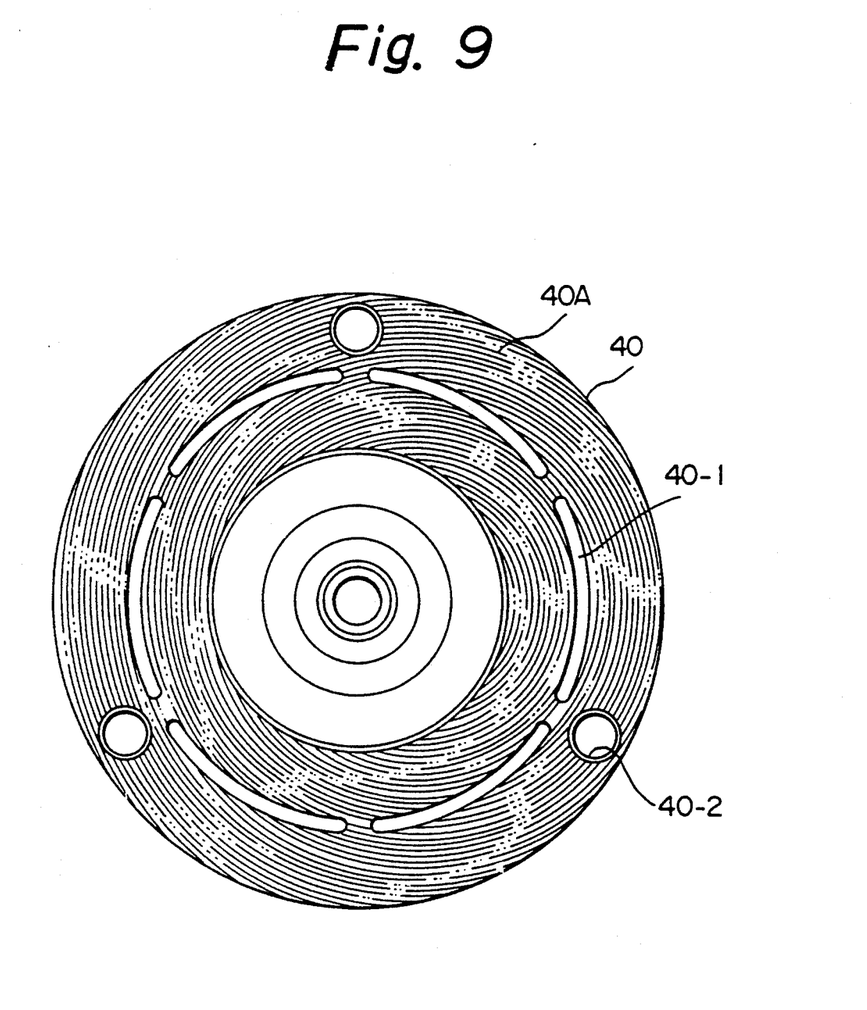

In the embodiment shown in FIG. 9, the armature 40 has a sliding surface 40A covered by tool marks formed of a plurality of circles having a different diameter eccentric to the axis of rotation.

It should be noted that the traces can be cut in one of the sliding surfaces of the rotor and the armature, or in both.

Although the embodiments of the present invention are described with reference to attached drawings, many modifications and changes can be made by those skilled in this art without departing from the scope and spirit of the invention.

we claim:

1. An electromagnetic clutch comprising:
a rotor having an axis for rotation, and connected to said source, the rotor having a first sliding surface extending transverse to said axis;
an armature connected to said receiver and having a second sliding surface extending transverse to said axis;
means for generating a resilient force urging the first and the second sliding surfaces to be axially spaced at a predetermined distance therebetween, and;
a solenoid which, when energized, generates an electromagnetic force that forces the first and the second sliding surfaces into contact with each other against the force of the resilient means;
at least one of the first and the second sliding surfaces including, along an entire area thereof, cut mark means having a center which is eccentric to said axis of rotation for improving an engagement between said first and second sliding surfaces.

2. An electromagnetic clutch according to claim 1, wherein radii of the cut mark means between said center and a point on the cut mark means, are gradually increased in a direction from a center to an outer periphery of the sliding surface.

3. An electromagnetic clutch according to claim 1, wherein said cut mark means are constructed by first cut mark means formed having a first radius which is increased from a center to an outer periphery of the sliding surface, and second cut mark means formed having a second radius which is decreased from the outer periphery to the center of the sliding surface.

4. An electromagnetic clutch according to claim 1, wherein said cut mark means are formed only on the sliding surface of the rotor.

5. An electromagnetic clutch according to claim 1, wherein said cut mark means are formed only on the sliding surface of the armature.

6. An electromagnetic clutch comprising:
a rotor having an axis for rotation, and connected to said source, the rotor having a first sliding surface extending transverse to said axis;
an armature connected to said receiver and having a second sliding surface extending transverse to said axis;
means for generating a resilient force urging the first and the second sliding surfaces to be axially spaced at a predetermined distance therebetween, and;
a solenoid which, when energized, generates an electromagnetic force that forces the first and the second sliding surfaces into contact with each other against the force of the resilient means;
at least one of the first and the second sliding surfaces including thereon first cut mark means concentric to said axis of the rotation and having a gradually increased radius from a center to the outer periphery of the sliding surface, and second cut mark means concentric to said axis of rotation and having a gradually decreased radius from the outer periphery to the center of the sliding surface, an arrangement of the first and the second cut mark means being such that they cross each other at locations randomly distributed across an entire region of the sliding surface.

7. An electromagnetic clutch comprising:
a pulley connected to said;
a rotor having an axis for rotation and having a first sliding surface extending transverse to said axis, the rotor being located radially inwardly of the pulley;
the rotor being connected to the pulley first end so that the pulley axially overhangs the sliding surface of the rotor;
an armature connected to said receiver and having a second sliding surface extending transverse to said axis;
means for generating a resilient force urging the first and the second sliding surfaces to be axially spaced with a predetermined distance therebetween, and;
a solenoid which, when energized, generates an electromagnetic force that forces the first and the second sliding surfaces into contact with each other against the force of the resilient means;
the first sliding surface on the rotor including thereon cut mark means of a generally circular shape, said circular shape having a center which is eccentric to said axis of rotation and having an increased radius in a direction from a center to an outer periphery of the sliding surface.

* * * * *